United States Patent [19]

Smith

[11] 4,284,372

[45] Aug. 18, 1981

[54] EFFICIENT HANDLING AND CHARGING SYSTEM FOR EXPANDED, LOW-DENSITY, LOOSE-FILL PACKAGING MATERIAL(S)

[75] Inventor: Layle V. Smith, Pataskala, Ohio

[73] Assignee: The Dow Chemical Company, Midland, Mich.

[21] Appl. No.: 95,697

[22] Filed: Nov. 19, 1979

[51] Int. Cl.³ .............................................. B65G 53/60
[52] U.S. Cl. .................................. 406/106; 406/156; 406/160
[58] Field of Search .............. 406/106, 155, 156, 157, 406/160, 163, 181, 183; 138/39; 193/32; 137/861, 875, 884

[56] References Cited

U.S. PATENT DOCUMENTS

| 3,417,881 | 12/1968 | Loveless | 193/32 X |
| 3,708,208 | 1/1973 | Fuss | 406/155 X |
| 3,762,772 | 10/1973 | Fuss | 406/183 X |

FOREIGN PATENT DOCUMENTS

| 1074929 | 7/1967 | United Kingdom | 406/106 |
| 1442898 | 7/1976 | United Kingdom | 406/155 |

Primary Examiner—Jeffrey V. Nase
Attorney, Agent, or Firm—R. B. Ingraham

[57] ABSTRACT

A continuous handling and dispensing system for pneumatically conveyable, particulate packaging materials, such as foamed plastic dunnage, involves continuous, air-entrained circulation of the material in an essentially closed loop header installation. The header is most advantageously connected to a plurality of dispensing hoppers. Baffles are employed to deflect gas and material into the hoppers and prevent plugging of the header.

20 Claims, 12 Drawing Figures

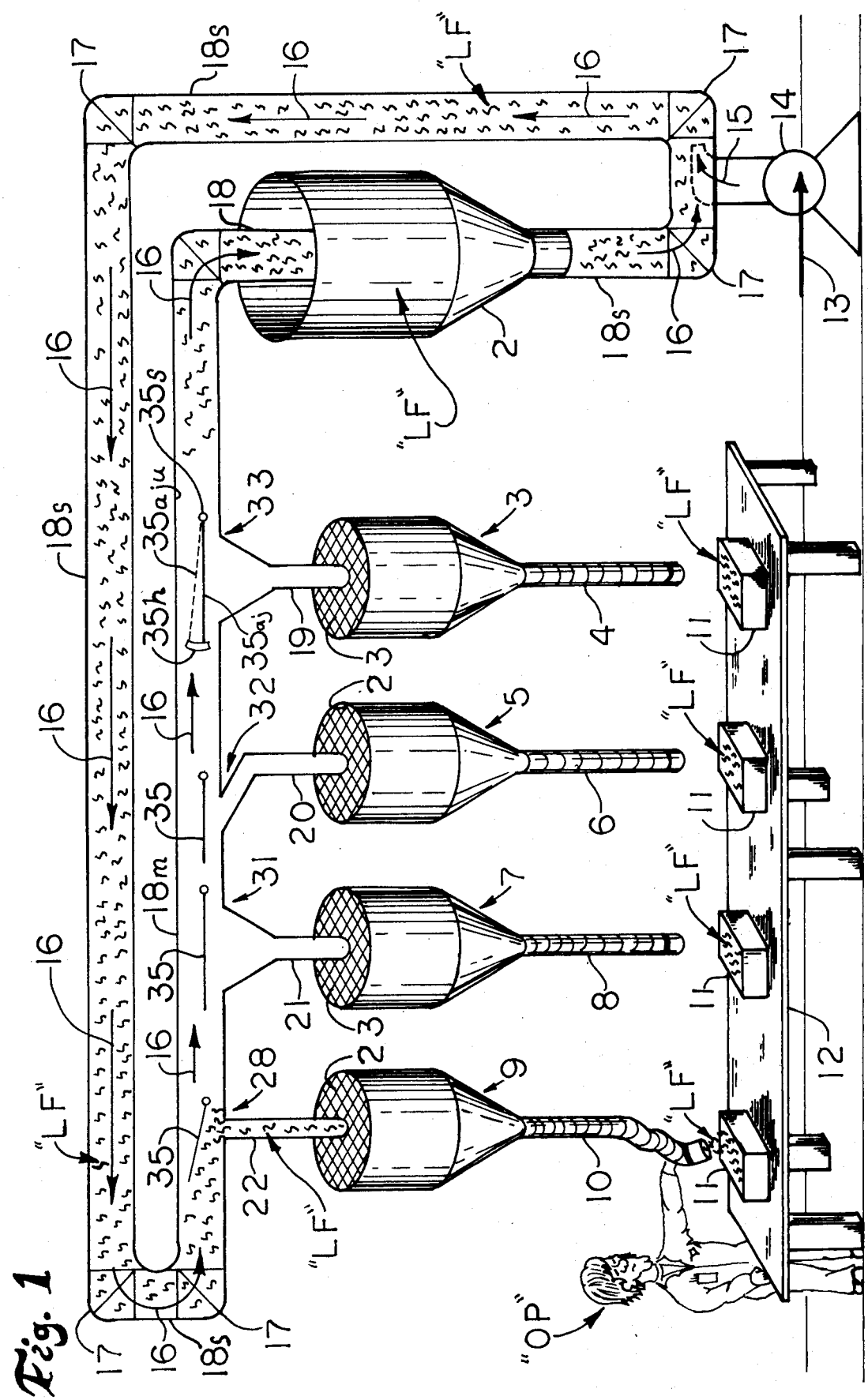

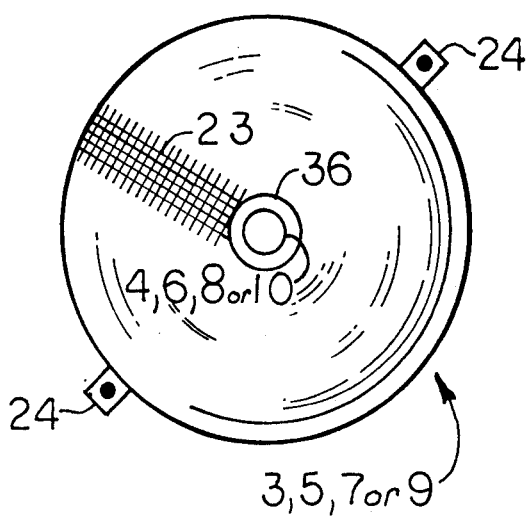
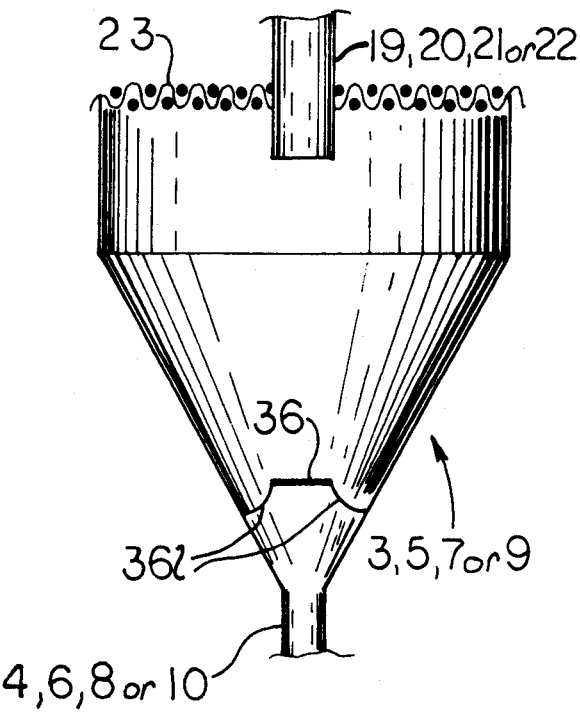
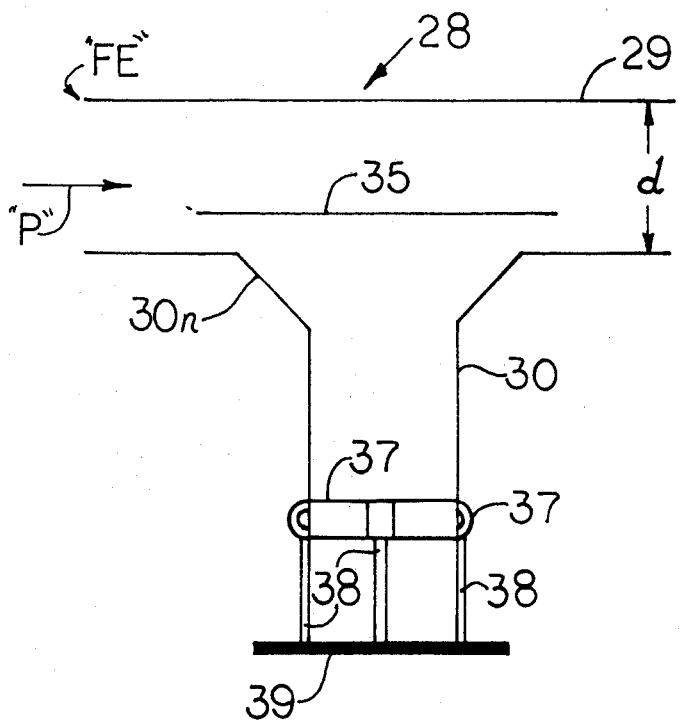
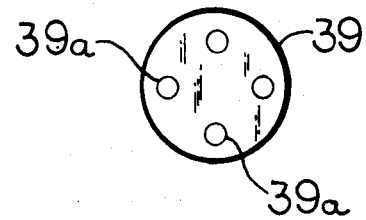

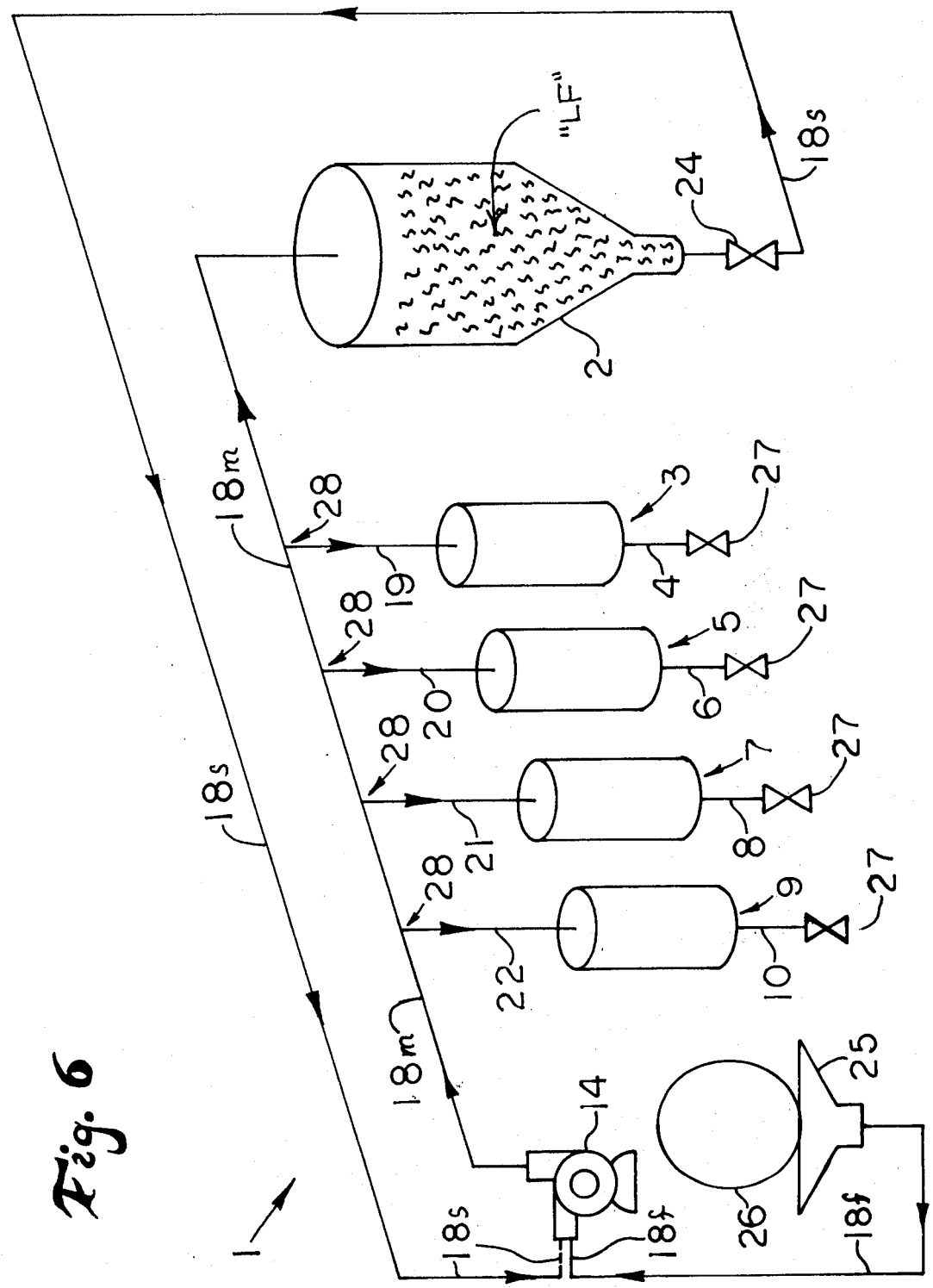

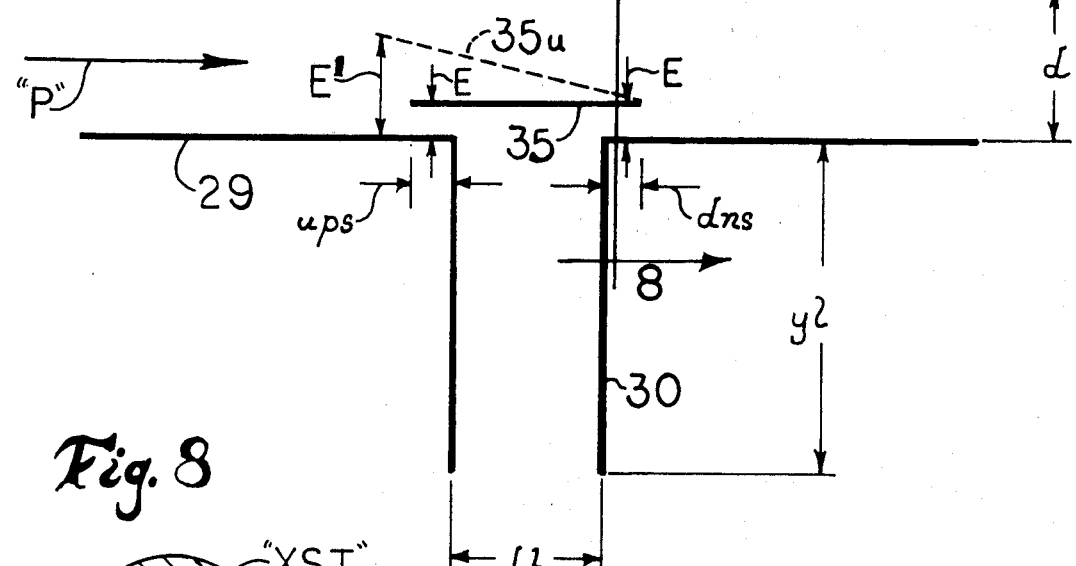
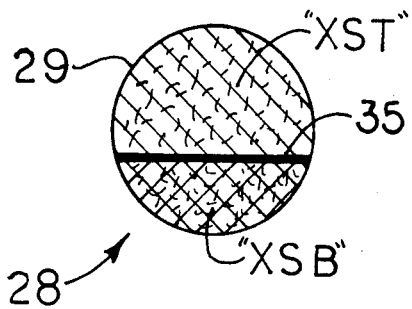
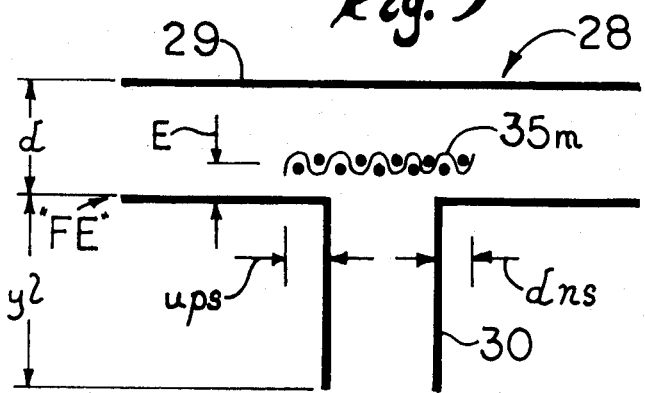
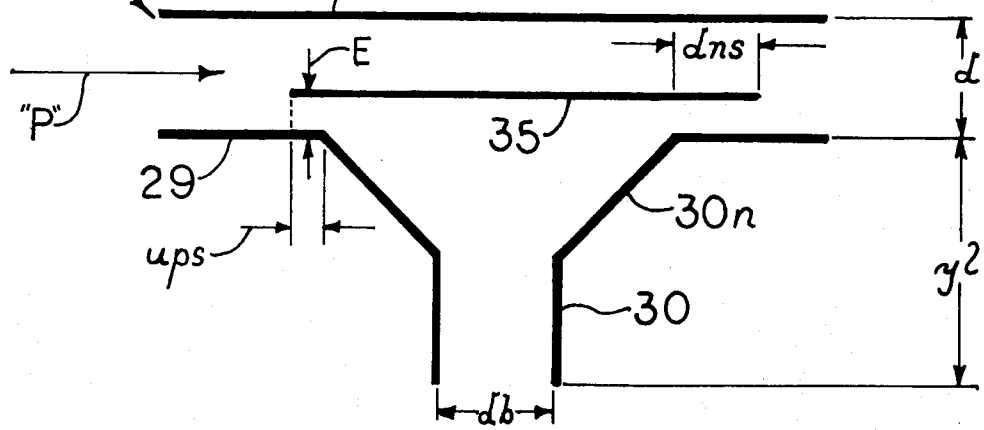

EFFICIENT HANDLING AND CHARGING SYSTEM FOR EXPANDED, LOW-DENSITY, LOOSE-FILL PACKAGING MATERIAL(S)

BACKGROUND OF THE INVENTION

The so-called "loose fill", lightweight, generally expanded or foamed, particulate packaging and cushioning materials have enjoyed good success and ever-increasing application and usage. They are frequently foam plastic products; although natural materials are also utilized.

While not restricted thereto, the synthetic plastic foam particles employed are often prepared from polystyrene or various styrene polymers which are expanded into desired porous structure(s) and wanted particulate shape(s) by various techniques involving use of blowing agents for the purpose. Of the natural goods, vermiculite is also a fairly popular choice for the indicated purpose. This includes products from any of a number of micaceous minerals, (such as kerrite, maconite, etc.) which are hydrous silicates generally derived from the alteration of some kind of mica; and so-called because the scales thereof generally open up when heated to oftentimes produce relatively light weight and frequently long, somewhat worm-like forms. Even popcorn (generally treated against spoilage) finds widespread application for the indicated packaging and cushioning usages.

The synthetic, plastic forms of low-density, loose-fill packaging are widely known and employed. They vary in sizes and also have shapes ranging from relatively spherical particles to those that can be, in configuration, more or less; signoidal; worm-resembling; ring-structured; macaroni (straight or elbow)-like; unhulled peanut-appearing; star-shaped; and so forth. For most practical purposes, the styles that are not overly self-entangling or mutually too-tightly interlocking are preferred for obvious reasons of easier and more effective mobility and handleability. In the latter connection, some alleviation of the problem in handling self-entangling particles is sometimes expectable if and when the particles are conveyed in air entrainment through rather unusually large size ducts and other conveyance conduits.

Good illustration of attractive plastic loose-fill packaging materials is typically had in U.S. Pat. Nos.: 2,681,231; 3,167,600; 3,188,264; 3,400,037; 3,481,455; 3,723,237; 3,855,053; and 3,887,672. Commercial examples of such materials include those available under the trade-designations "PELASPAN" (Reg. TM) and "PELASPAN-PAC" (Reg. TM) from THE DOW CHEMICAL COMPANY of Midland, Mich. 48640 and "STYRAPOR" (Reg. TM) from BADISCHE ANILIN & SODA-FABRIK (i.e., "BASF") of Ludwigshaven am Rhine, Western Germany.

In broad generality, the apparent or bulk density of the loose-fill packaging materials employed ranges from about 1/5 to about 2 lbs/ft.$^3$ (ca. 3.2 to 32 kg/m$^3$). Usually, however, materials with bulk densities exceeding about 1 or so lb/ft.$^3$ (ca. 16 kg/m$^3$) are not of the greatest preferability or desirability for utilization.

The known art for utilization of loose-fill packaging materials is restricted to almost exclusive use of manual diverter valves to charge or fill holding hoppers or single loading stations. Use of product-diverting conventional fittings in assemblies for such purpose (including, but not limited to "TEE's", "ELL's", "Y's", etc.) is almost prohibited and literally impossible because of the continuous "plugging" and "jamming" propensity of the loose-fill material being attempted to be passed through headers or feed ducts with which such fittings are connected. Thus, the ordinary installations perforce require considerable head room in order to function.

Actually, the handling of these vexatious problems has not had satisfactory or proper treatment or solution.

Fairly appraised, nothing in prior art appears to realistically concern itself with nor teach or lead to an effective, efficient and extremely reliable means and technique for efficiently and satisfactorily handling and charging expanded, low-density, loose-fill packaging materials in the manner of design embodiment and beneficial functionality and operability in the way so crucially indigenous as in the present contribution to the art.

FIELD AND PURVIEW OF THE INVENTION

The present invention, and the principle aims and objectives attainable in its practice, pertain(s) and direct(s) to a novel and, in the overall, unprecedented and exceptionally efficient means and technique for the indicated exceptonally efficient and utile handling and charging of loose-fill packaging materials of the delineated varieties which (in implementation and cooperative combination of the essential parts, elements and components therefor and actions and manipulations thereof) effectuates:

(1). An effective and continuous means and procedure for automatically dispensing plastic foamed and like loose-fill material from a header wherein the material, when the system is in use, is continuously circulated in and through a central main header connected to at least one (and preferably a plurality of) dispensing hopper(s) with baffles employed in the diversion fittings utilized to deflect gas and the loose-fill material into the individual hoppers via a closed system, with substantially no plugging of or intolerable blockages in the header loop.

(2). Provision of a free-flowing packing system that handles literally all loose-fill materials with great facility even when installed in building spaces with severely limited ceiling heights; all adapted for use in any area normally intended and planned for loose-fill packaging operations.

(3.). Realization of a system in which the material flows back in the header when the individual hoppers are filled; thus greatly reducing manpower requirements for filling the containers.

(4). Maximized avoidance of problems and consequences, including those arising from material plugging during the conveyance for package filling; plus (5). Utmost economy in loose-fill material utilization and handling and minimization of product wastage(s) and loss(es).

The achievement and provision of all indicated, with even more and additionally other benefits and advantages derivable in and from present practice appear and become more evident in the ensuing description and Specification.

CAPSULIZATION OF THE INVENTION

The present invention, in its genesis and as derives from the discovery on which it is based, pertains to the indicated novel means (and associated procedures) comprising, in cooperative combination assembly in a loose-fill handling and packaging system: a baffle arrangement installed in a closed duct circuit that diverts a flowable, plastic foam or like or equivalent loose-fill material from a main header through a discharge opening thence to designated containers. When the containers are full, all the loose-fill material remaining continues to circulate through the main header from the packing station holding containers back to the main supply holding stopper. As material is removed from the discharge opening(s) of the involved fitting(s), the system again allows flowability of the loose-fill material into any of the involved packaging stations.

The contemplated type of diverter valving allows continuous and automatic loading into containers being packed from holding hoppers above each individual packaging station.

Method usage, as implied, of the contemplated system is also here contemplated and intended as an integral part of the invention.

Still other features and implementations of beneficial import and salience are advantageously combinable in and made integral part(s) of the basic and above-delineated efficient handling and charging system for expanded, low-density, loose-fill packaging materials and according to the invention.

Thus, various suitable parts, elements, sub-assemblies and overall assemblies plus other equippage for utilization, as well as working details, embodimental instructions and parameters and other specifics of the invention are also set forth in the following Specification.

ILLUSTRATED EXEMPLIFICATION OF THE INVENTION

The invention is pictorially demonstrated in and by the twelve (12) views of the accompanying Drawing (all of which, for simplicity and convenience, are illustrated in rather schematic and/or fanciful manner of representation and utilize, insofar as possible, the same reference numerals and letter designations for like and/or similar parts and/or elements and/or movements) wherein, as they are to be taken in conjunction with the Specification that follows:

FIG. 1 is a generalized, perspective front elevation view of an entire system in accordance with the present invention;

FIGS. 2 and 3, respectively, are schematic top (or plan) and side elevation views of a typical metal hopper for packaging loading station supply which is charged from the system with the loose-fill packaging materials that are utilized;

FIG. 4 is a side elevation view of a fitting arrangement to accommodate a fabric or bag-type station supply hopper;

FIG. 5 is the deflection plate element in the bag hopper fitting of FIG. 4;

Figure 11:
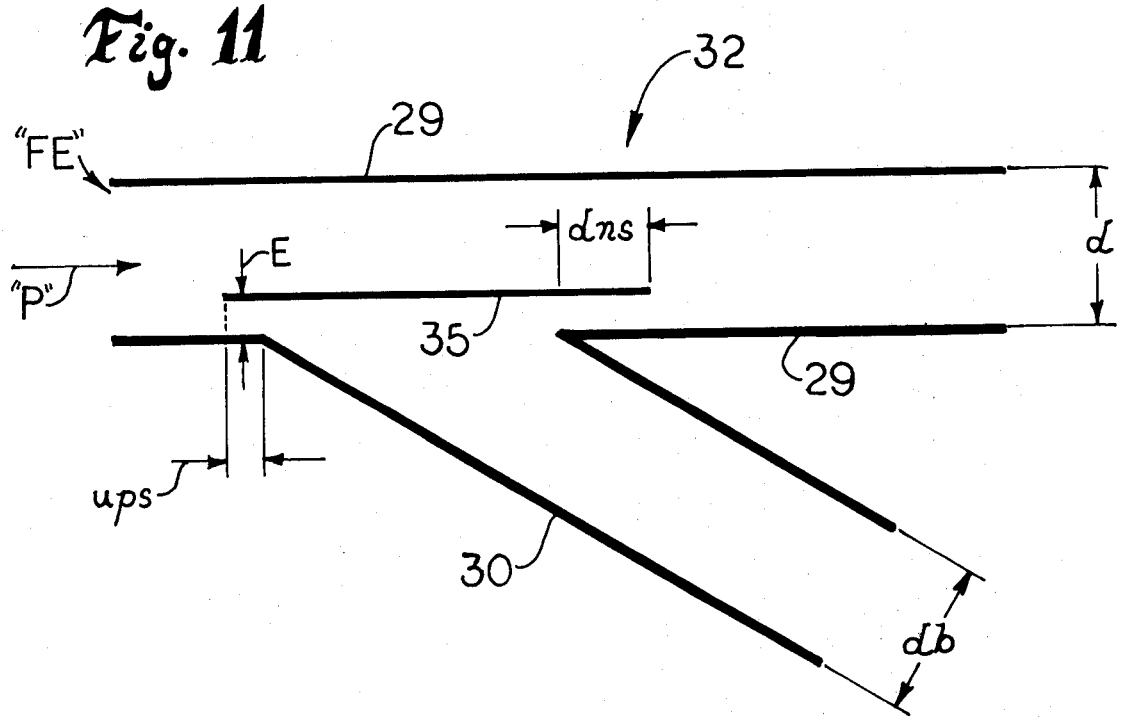
Figure 12:
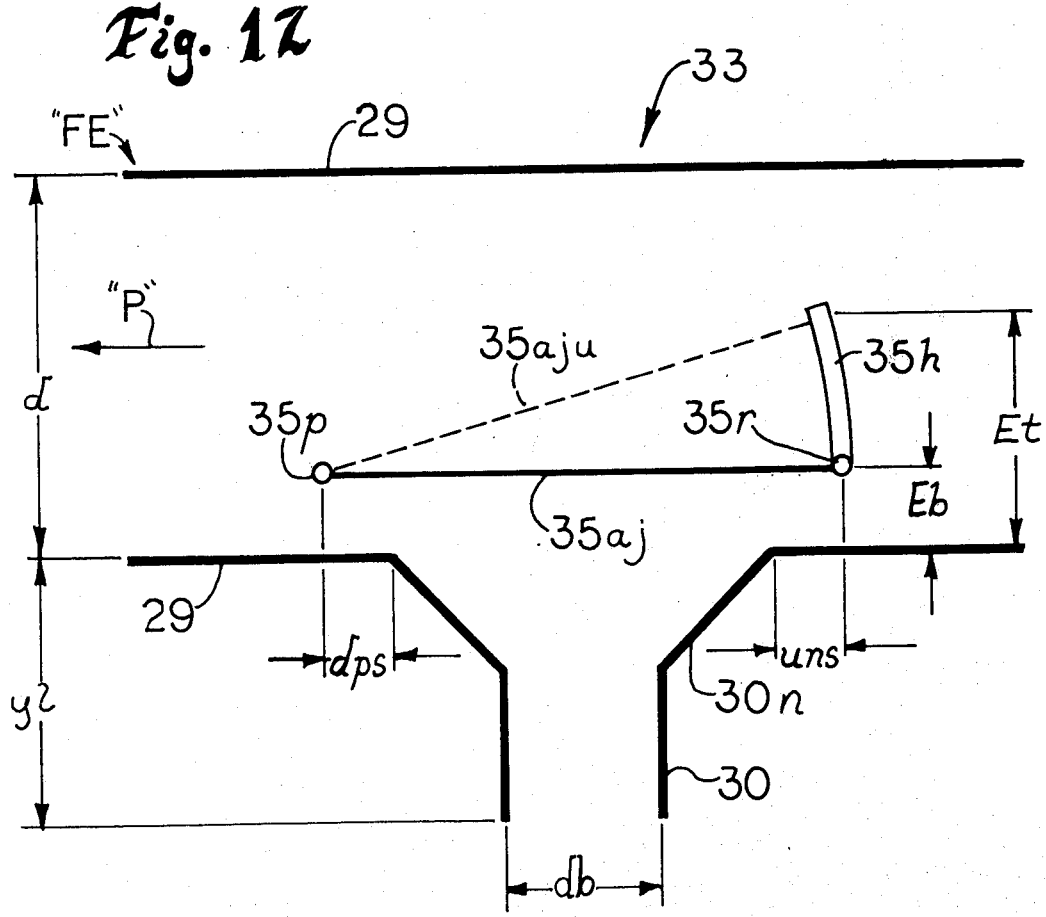

FIG. 6, somewhat in flowsheet style of presentation, is a very simplified, line-drawing sort of representative view of the sort of assembly shown in FIG. 1 and also illustrating a means of loose filler supply;

FIG. 7 is a simplified, line-drawing side elevation view of an advantageously baffled type of "TEE" fitting structure for use in practice of the invention;

FIG. 8 is a rudimentary cross-sectional view, taken along the Line 8—8 in FIG. 7, illustrating the area proportion under the baffle means within a loading station feed fitting to achieve utmost benefit of practice pursuant to the invention;

FIG. 9, in the side elevation manner of FIG. 7, shows a varied style of baffle means possible to employ in practice of the invention;

FIG. 10, shows, in simplified side elevation viewing, a preferred form of modified "TEE" fitting to utilize for present purposes;

FIG. 11 illustrates, in a simplified side elevation view, a "Y" fitting adapted with baffle means for use in embodiments of the invention; and FIG. 12, also in simplified side elevation viewing, shows an adjustable pitch style of baffle means utilizable for various fittings employed in assemblies in keeping with the invention.

For expedience and enhanced clarity of associated: parts; elements; components; subassemblies and assemblies; certain companion movements, functions and so forth, reference is now thereto had to all such predominant cooperative componential features as they appear in all the accompanying FIGURES included in the Drawing with explanation thereof in the following catalogued description of same as they are identified by their respective reference numeral(s) or letter designations (i.e., "Ref. No(s).") therewith joined (and described in non-sequential order usually depending on their appearance as they occur in the respectively portrayed views of the Drawing).

| Ref. No(s). | Description With Relevant Corollary Explanation |
|---|---|
| 1 | General designation of the indicated sort of continuous and automatic apparatus assembly, shown in the overall only in FIGS. 1 and 6. While only a single packaging station may be employed in an assembly in accordance with the invention, it is almost invariably the more frequent practice and usually much more expedient and preferable to have a plurality of conjoint, side-by-side operating loading stations in any given "PELASPAN-PAC" or the like packaging installation. Thus, as such plural stand units are depicted in the Drawing, it is commonly desirable for six or even eight, twelve (or more) to be arranged one next to another in any given installation. Naturally, this depends on packaging speed and unit fill rapidity required and particular supply demand involved. Such multiple-stand facilities inherently give the evident benefit of better and more satisfactory realization of optimum results in practice of the invention. As has been indicated, the presently contemplated system(s) very advantageously allow(s) packaging stations to be installed where ceiling height is limited. It also has the added benefit of being capable of replacing large storage bags and manual diverter valves where overhead space is a limiting or primary concern. |
| "OP" | An operator, shown only in FIG. 1, filling a container or box with the loose-fill packaging. |
| 2 | Shown only in FIGS. 1 and 6, the main or bulk supply storage or back-up supply hopper. |
| 3, 5, 7 & 9 | Generally designated packaging station holding hoppers (FIGS. 1 and 6 only) which are of an inherently gas-ventable nature. |
| 4, 6, 8 & 10 | Flexible delivery hoses for discharging the loose-fill packaging material to the boxes or other containers being packaged (FIGS. 1 and 6 only). |

-continued

| Ref. No(s). | Description With Relevant Corollary Explanation |
|---|---|
| 11 | The box or other container being packaged (FIG. 1 only). |
| 12 | Also only in FIG. 1, the support stand or table to hold the containers being packaged. Conveyor belts and the like, with built-in stop motions and so forth, may advantageously be utilized for more automated container carriage. |
| 13 | The feed arrow indicating the air supply inlet for supplying the venturi blower (or like or equivalent particulate "pump") means 14 (FIG. 1 only). |
| 14 | The venturi blower (FIGS. 1 and 6 only) for air supply, such as a "QUICK-DRAFT" Model Q5 blower. |
| 15 | A directional arrow showing the path of forced air into the closed duct system for entrained circulation of loose-fill packaging material out of bulk supply hopper 2 through the system loop. |
| 16 | Directional arrows showing recirculating path of the entrained loose-fill packaging material in its travel through the closed loop ductwork network of the system (FIG. 1 only). |
| 17 | An elbow (or "ELL") in the closed loop system (FIG. 1 only). |
| 18s | The supply duct portion feeding from bulk hopper 2 into the discharge header portion 18m of the system (FIGS. 1 and 6 only). |
| 18m | The main or discharge header in which the baffled fittings employed in practice of the invention are installed (FIGS. 1 and 6 only). |
| 19, 20, 21 & 22 | Discharge lines from baffled fittings in the main header to packaging station holding hoppers 3, 5, 7 and 9 (FIGS. 1 and 6 only). |
| "LF" | General identification of the loose-fill packaging material (FIGS. 1 and 6 only). |
| 23 | Removable expanded metal or the like tops or covers for packaging station holding hoppers 3, 5, 7 and 9 (FIGS. 1, 2 and 3 only). |
| 24 | Support ears (FIG. 2 only) for hopper top 23. |
| 25 | Inlet funnel for charging loose-fill packaging material into system from supply bag or cartridge 26 (FIG. 6 only). |
| 26 | Incoming charge or supply bags or flexible carboy for "PELASPAN-PAC" or the like (FIG. 6 only). |
| 18f | Feed duct for getting incoming loose-fill packaging into system through venturi blower 14 (FIG. 6 only). |
| 27 | Control valves (such as "SISSOR" type) for outlet from packaging station holding hoppers 3, 5, 7 and 9 of loose-fill material into containers being packaged (FIG. 6 only). |
| 28 | General designation of baffled "TEE" outlet fitting (FIGS. 1, 6, 7 and 9 only). |
| 31 | General designation of modified baffled "TEE" outlet with a roughly funneled or downwardly and inwardly tapered or conical outlet neck portion (FIGS. 1, 4 and 10 only). This is a highly advantageous and oftentimes preferably fitting design. |
| 32 | General designation of baffled "Y" outlet fitting (FIGS. 1 and 11 only). |
| 33 | General designation of modified "TEE" outlet fitting provided with adjustable baffle means (FIGS. 1 and 12 only). |
| 35 | Stationary baffle in fittings, usually a solid plate or the like. |

-continued

| Ref. No(s). | Description With Relevant Corollary Explanation |
|---|---|
| 35m | Stationary baffle of mesh, corrugated wire or grid foraminous construction (FIG. 9 only). |
| 35u | Stationary baffle in upwardly tilted position angled to have greater opening towards upstream or female end of fitting (shown in dashed-line phantom representation in FIG. 7 only). |
| "FE" | General designation of female (or upstream) end of fitting(s). |
| "P" | Flow arrow(s) of air entrained "LF" material being blown in circulation through closed loop systems. |
| 29 | Duct or equivalent conduit walls. These, generally and preferably are cylindrical and of the typical stovepipe style, although square, rectangular or other cross-sectionally shaped conduits may be utilized. |
| 30 | Feed or delivery outlet(s) from fitting(s) leading and diverting loose-fill material to packaging station holding hoppers 3, 5, 7 and 9. |
| 30n | Tapered conical neck portion of modified "TEE" 31 at upper end of its side outlet. |
| E | Elevation height of baffle over or up from bottom of duct or other conduit walls 29. |
| E' | Elevation height at upwardly tilted end of angled stationary baffle 35u (FIG. 7 only). |
| ups | Upstream extension or overlap distance along duct bottom in front edge of outlet(s) 30 in fitting(s) (or, in case of modified "TEE" of FIGS. 4 and 10, in front of junction of downwardly and inwardly tapered conical neck portion 30n). |
| dns | Downstream extension or overlap distance along duct bottom to rear edge of oulet(s) 30 in fitting(s) (or, in case of modified "TEE" of FIGS. 4 and 10, to rear of junction of downwardly and inwardly tapered conical neck portion 30n). |
| d | Diameter (or top-to-bottom dimension) of duct between wall(s) 29. |
| db | Diameter or side-to-side dimension of feed outlet(s) 30. |
| 35aj | Adjustable baffle (FIG. 12 only). |
| 35aju | Adjustable baffle in upward angled position with greatest elevation on upstream side (FIGS. 1 and 12 only). |
| 35p | Stationary pivot point of adjustable baffle 35aj. |
| 35h | Holding slide bracket for adjustable pivot adjustment (FIG. 12 only). |
| 35r | Rod holders to work or move adjustable pivot along slide bracket 35h (FIG. 12 only). |
| Eb | Elevation height of adjustable bracket when flat (FIG. 12 only). |
| Et | Uppermost elevation height of upwardly tilted end of adjustable bracket (FIG. 12 only). |
| yl | Length of outlet side arm in "TEE" and modified "TEE" fittings. |
| "XST" | Cross-sectional area above baffle in duct (FIG. 8 only, in spaced, modified section lines). |
| "XSB" | Cross-sectional area below baffle in duct (FIG. 8 only, in cross-hatched, modified section lines). |
| 36 | Deflection and distribution baffle in metal packaging station holding hoppers 3, 5, 7 and 9 (FIGS. 2 and 3 only). These baffles are important to avoid having the loose-fill carrying velocity of the system remain undeflected and not |

| Ref. No(s). | Description With Relevant Corollary Explanation |
| --- | --- |
| | retarded so as to carry through to the bottom outlet valve. |
| 361 | Support legs (usually three in number, but variable) for distributor baffle 36. |
| 37 | Holding clamp ring for bag or fabric hopper (with bag not shown), illustrated in FIG. 4. |
| 38 | Plate strips, usually about 1 inch in width, for supporting deflection plate for fabric hopper arrangement. |
| 39 | Deflection and distributing plate for fabric hopper arrangement (FIGS. 4 and 5 only). Its function and purpose is analogous to that explained for baffle 36. |
| 39a | Connecting points to secure deflection plate 39 to and with plate straps 38 (FIG. 5 only). |

In this connection, the basic principles and limitations of: the basic loose-fill packing materials involved; conventional and normal systems for the handling of and packaging with loose-fill packing materials in or out of arrangements with or without air-entrained distribution transport; storage hoppers and bins for such loose-fill materials; baffle construction; ducts and ductwork, conduit and conventional fittings for conveyance of such loose-fill materials; valves and control devices for utilizing and dispensing the indicated type of light weight, particulate packaging goods; and so forth, are so widely comprehended by those skilled in the art that greatly detailed elaboration of all the basics thereof is not herein made or attempted; the same being unnecessary for thorough understanding and recognition of the advance possibilitated for achievement and realization by and with the development in and of an efficient handling and charging system and technique for utilization of and for expanded, low-density, loose-fill packaging material(s) and the like improvement that is according to and in keeping with the present invention.

PARTICULARIZED OPERATION AND USE DESCRIPTION OF THE INVENTION

As is clearly evident and readily-enough apparent in and not-difficultly deducible from the foregoing disclosure and description, practice of the present invention in basic essence and substance proceeds and involves implementation in the following way (keeping mention of parts and elements to purposely specific and at this point non-generalized items):

(I). The main hopper 2 is charged with the desired loose-fill packaging material (this, quite frequently, very advantageously being one of the "PELASPAN-PAC" Brand line of goods). Main hopper charging is readily accomplished in the way demonstrated in FIG. 6 of the Drawing, using the venturi blower 14 to draw the loose-fill material into the system through feed duct 18f. However, resort can be had to any other procedure for main hopper charging.

(II). With venturi blower 14 operating, the loose-fill material is circulated through the closed (ultimately 360° return to main hopper) ductwork of the system including the supply portion 18s thereof and the main header 18m in which the baffled packing station fittings are disposed.

(III). Under each fitting there is a packaging station holding hopper, each of which becomes loaded by diversion from the main header of loose-fill material passing under the baffle in each fitting to be dropped (at least in relatively substantial proportions of that passing under the baffle) through each fitting outlet until the station holding hopper (3, 5, 7 and/or 9) is full.

(IV). Escaping air (which is minimized) through the fitting outlet is vented through the grillwork cover 23 of each holding hopper or through the fabric wall structure of a bag hopper.

(V). Loose-fill material circulating through the closed loop ductwork not diverted to the packaging station holding hoppers 3, 5, 7, 9, etc., returns to the main hopper 2 at the terminating end of main header 18m leading thereinto.

(VI). When a box or other container 11 is to be packaged (which usually contains or will contain some article or goods needing protective, cushioning packaging), the operator opens control valve unit 27 for feeding the loose-fill material into the box. This is distributed as desired in the box by manipulation of flexible delivery hoses 4, 6, 8, 10, etc. Along this line, the delivery hoses or tubes can be of rigid or semi-rigid construction if very particularized and constant patterns of box filling are involved. Almost invariably, however, flexible delivery hose outlets are preferred.

(VII). Replenishment of discharged loose-fill packaging material from the packing station holding hoppers is automatically made up by in-feed through the baffled fitting outlets 30.

(VIII). Replenishment of loose-fill charge in main hopper 2 can be done by incremental addition as needed. Or, it can be achieved more-or-less continuously by constant running of the necessary make-up from incoming supply container 26 through inlet feed duct 18f simultaneous with circulation of the loose-fill material through ductwork 18s and 18m in the closed loop through the same venturi blower 14 (using appropriate inlet proportionation to match delivery demand at the packaging stations), as indicated in FIG. 6 of the Drawing.

Systems in accordance with the present invention operate very satisfactorily, without substantial (if any) or bothersome plug-up, for prolonged periods of continuous and/or intermittant running.

For most satisfactory practice of and results from same in embodimentations of the present invention, there are several dimensional and physical and/or operating characteristics that are best adhered to and observed. These, as the most salient of same, include:

(i). A good general purpose ductwork size is one having a nominal diameter "d" of 7, 8 or 10 inches (i.e., ca. 17.8, 20.3 or 25.4 cm). Frequently, the 8-inch sizing is a most practical and widely satisfactory choice. Of course, any other size ductwork can be utilized, especially conduits of larger dimension than those specified. On the other hand, it is usually inadvisable to attempt to make installations with ductwork of less than 4-inch "d" (ca. 10.2 cm); and even sizes that small may give rise to undesirable plugging propensity in the system.

(ii). The fittings, of course, should and preferably do, have main line dimensions, i.e., the ends of same which interconnect in the main header 18s, the same as the sizing chosen for the system ductwork.

(iii). The diameter "db" or other equivalent dimension of the fitting feed or delivery outlets 30 should be at least 60–75% of diameter "d" of the ductwork. Thus, when system ductwork is 8-inch size, the side delivery outlet 30 should have a size of 5 to 6 inches (ca. 12.7 to 15.25 cm.), with equal sizing also being appropriate. The total drop (i.e., dimension "yl") to the holding hopper inlet of side diversion openings 30 in the fittings should be between about one-and-one half to two times the ductwork diameter. Thus, with 8-inch ductwork, a 12-inch drop (about 1.5 times) is ordinarily found to be satisfactory.

(iv). As mentioned, the modified baffle "TEE" 31 as shown in FIG. 10 of the Drawing, is very advantageous and generally least troublesome and relatively preferable to employ. In such fittings, the upward and outwardly directed angulation of the tapered neck portion should be between about 40° and 60°, with a 50° lateral profile slope thereabout frequently quite suitable. The upper throat end of the tapered neck section 30n in the modified "TEE" 31 should, roughly, in its lateral or lengthwise opening in the main header 18m, be about two-times or so the ductwork diameter. Needless to mention, the front-to-back dimension of the conical neck does not exceed ductwork diameter.

(v). Most advantageously, the baffles 35 are installed in at least substantially, if not entirely, parallel setting to the line of entrained loose material flow passing through the main header 18m. However, good results are also realizable with titled or inclined baffles in "TEE" fittings, such as that shown in FIG. "G" with the forwardly ascending stationary baffle 35m or, as illustrated in FIG. "12", with the adjustable baffle 35aj in "TEE" fitting 33. When inclined baffles are employed, the higher end elevation of same (such as "El" or "Et") should not be more than two to two-and-one-half times the elevation "E" (or "Eb") of the lower end of the baffle; this being applicable whether the inclined baffle is of a stationary or adjustable variety. Solid or plate-like baffling is generally more advantageous; although a foraminous, expanded metal or mesh baffle 35m such as is illustrated in FIG. 9 is suitable.

(vi). The cross-sectional area under the baffle (i.e., Area "SXB" in FIG. 8 of the Drawing) is most advantageously between about 15% and about 40% of the total cross sectional area of the involved ductwork. Thus, with further reference to the illustration of FIG. 8:

Area "XSB"=(0.15–0.40)×(Area "XSB"+Area "XST").

(vii). The baffle in the fitting(s) should extend beyond respective edges of the discharge opening:

(a). In dimension "dns" on the downward or downstream (opposite the female end, "FE") at least 35–50%, preferably about 40–43%, of the ductwork diameter "d"—this, for example, being about 3 inches (ca. 7.6 cm.) in a 7-inch system; and (b). In dimension "ups" on the inlet or upstream side (towards the "FE") at least 15–30%, preferably about 20–22%, of the ductwork diameter "d"—this, for example, being about 1½ inches (ca. 3.8 cm.) in a 7-inch system.

(viii). The "ELL" fittings in the closed loop should be relatively gentle and "sweeping", having radii at least three to five or more times the ductwork diameter "d". About three-and-one-half times is a good rule of thumb formula to follow for design of such broad and non-constricting "ELLS". Thus, in a 7-inch system, a good minimum radius for each "ELL" to install is at least 2 ft. (ca. 0.61 m).

(ix). Packaging station holding hoppers should generally have a 5 ft.$^3$ (ca. 0.14 m$^3$) capacity. In metal hoppers, each deflecting and distributing baffle 36 should have a diameter that is at least about 1.2 times the diameter "db" of the delivery tubes or hoses 4, 6, 8, 10, etc. Thus, in a 7-inch ductwork system with 6-inch delivery hose provisions, baffle 36 in each hopper 3, 5, 7, 9, etc., should have a diameter of about 7 inches (ca. 17.8 cm). For fabric hoppers, the deflection plate 39 (as shown in FIGS. 4 and 5) should be about one-and-one-half to two times the ductwork diameter in the system; preferably about twice the diameter of the delivery hose(s). Thus, in a 7-inch system with 6-inch delivery hose arrangements, deflection plate 39 should have a diameter of about 12 inches (ca. 30.5 cm).

(x). The blower 14 must have engineered design capacity to maintain a loose-fill entrainment velocity on completion of cycle circulation through the closed loop and back into the main holding hopper 2 of at least about 1,200 ft. (ca. 427 m) per minute at that point of the circuit, regardless of number of individual packaging stations included in the system. When employing a loose-fill packaging having a density of about 0.3 lbs/ft$^3$ (5.6 Kg/m$^3$), two or more blowers such as the blowers may be employed to maintain desired velocity throughout the system.

Many changes and modifications can readily be made in and adapted to embodiments and practices in accordance with the present invention without departing substantially from its apparent and intended spirit and scope, all in pursuance and accordance with the same as it is set forth and delineated in the hereto-appended claims.

What is claimed is:

1. In a handling and dispensing system for filling containers and the like with expanded, low-density, loose-fill packaging material which is comprised of and wherein there are included:

(a) a main supply storage hopper for said loose-fill material; which is integrally in the circuit of (b) a circulating system having at least a main header run for air-entrained conveyance of said loose-fill material out of and back into said main hopper (a); and (c) air blowing means for entraining and carrying said loose-fill material through said circulating system (b); with (d) a main header run in said circulating system (b) from which said loose-fill material is supplied and diverted; to (e) at least a single packaging station in said system whereat said loose-fill material is dispensed for package filling and/or cushioning purposes; with (f) each packaging station (e) having a separate holding and dispersing hopper for individual station supply of said loose-fill material; and (g) each packaging station (e) having a distributing tube from its said holding hopper (f) to let out and dispense said loose-fill material for said packaging and cushioning purposes from each of said station holding hoppers (f); and also (h) control valve means in each of said distributing tubes (g) for regulating the package filling flow of said loose-fill material from out of said distributing tube; with (i) at least one diversion fitting(s) in said main header run (d) with (j) outlet(s) therein for feeding said loose-fill material to each separate holding hopper (f) at each single packaging station (e);

the improvement comprising:

(k) baffle means in each diversion fitting (i) which are within the confines of the said main header run (d) and situate over and above the entry of each outlet (j) into said main header run (d) within each of said fittings (i) with the further limitation that the baffle means extends upstream and downstream beyond lateral edges of the discharge outlet, whereby and whereupon air-entrained loose-fill material is so deflected and diverted into each of said holding hoppers (f) as to at least substantially avoid if not entirely prevent plugging of said loose-fill material in said main header run (d).

2. A loose-fill packaging material handling and dispensing system in accordance with that delineated in claim 1, wherein there are a plurality of said packaging stations (e).

3. A loose-fill packaging material handling and dispensing system in accordance with that delineated in claim 1, wherein at least one of said diversion fittings (i) is in the design form of a baffled "TEE".

4. A loose-fill packaging material handling and dispensing system in accordance with that delineated in claim 1, wherein at least one of said diversion fittings (i) is in the form of a modified, baffled "TEE" with a roughly downwardly and inwardly conically funneled throat portion leading into and at the upper end of its side entry into said fitting above its outlet opening extension therefrom.

5. A loose-fill packaging material handling and dispersing system in accordance with that delineated in claim 1, wherein at least one of said diversion fittings (i) is in the design form of a baffled "Y".

6. A loose-fill packaging material handling and dispensing system in accordance with that delineated in claim 1, wherein at least one of said diversion fittings (i) is in the design form of a baffled "TEE"; and said baffle means (k) in said fitting (i) is adjustable so as to be tiltably inclinable upwards towards the downstream end of said fitting.

7. A loose-fill packaging material handling and dispensing system in accordance with that delineated in claim 1, wherein at least one of said diversion fittings (i) is in the form of a modified, baffled "TEE" with a roughly downwardly and inwardly conically funneled throat portion leading into and at the upper end of its side entry into said fitting above its outlet opening extension therefrom; and said baffle means (k) in said fitting (i) is adjustable so as to be tiltably inclinable upwards towards the downstream end of said fitting.

8. A loose-fill packaging material handling and dispensing system in accordance with that delineated in claim 1, wherein said baffle means (k) is so disposed within said fitting (i) that the cross-sectional area beneath the baffle means over and above said fitting outlet (j) in said main header run (d) is between about 15% and about 40% of the total cross-sectional area of the main header run passing through said fitting (i) proper.

9. A loose-fill packaging material handling and dispensing system in accordance with that delineated in claim 1, wherein said baffle means (k) is a solid plate.

10. A loose-fill packaging material handling and dispensing system in accordance with that delineated in claim 1, wherein said baffle means (k) is of a foraminous sheet construction.

11. A loose-fill packaging material handling and dispensing system in accordance with that delineated in claim 1, wherein the nominal diameter of the ductwork in the system network (a) and said main header run (d) is from 7 to 10 inches.

12. A loose-fill packaging material handling and dispending system in accordance with that delineated in claim 1 and including, wherein the circulating system is a closed loop in addition thereto and in combination therewith;

(l). at least a single "ELL" connection fitting in said closed-loop, ductwork system network; with each of said "ELL" connections being of a gentle and broadly sweeping design with a radius thereof that is at least three-times the general ductwork diameter in said system network.

13. The combination of claim 12, wherein the "ELL" radius is about three-and-one-half-times that of the ductwork diameter.

14. A loose-fill packaging material handling and dispensing system in accordance with that delineated in claim 1, wherein said loose-fill packaging material has an apparent or bulk density that is between about 1/5 and about 2 pounds per cubic foot.

15. Loose-fill packaging material handling and dispensing system in accordance with claim 14 wherein the loose-fill packaging material has an apparent density that is not in substantial excess of about 1 pound per cubic foot.

16. A loose-fill packaging material handling and dispensing system in accordance with that delineated in claim 1, wherein p1 said loose-fill packaging material is an expanded, particulate, plastic foam product.

17. A loose-fill packaging material handling and dispensing system in accordance with claim 16 wherein the product is shaped polystyrene foam particles.

18. A loose-fill packaging material handling and dispensing system in accordance with that delineated in claim 1, wherein said air blowing means is adapted to return air-entrained loose-fill material at the exit of said main header (d) back into said main supply hopper (a) at a velocity of at least about 1,200 feet per minute.

19. A loose-fill packaging material handling and dispensing system in accordance with that delineated in claim 1, wherein (m) each of said packaging station holding hoppers (f) has therein provided deflection and distribution baffling means, whereby and whereupon the loose-fill entrained gas-carrying velocity of the system is thereby deflected and at least substantially retarded in its ability to carry through the bottom outlet of the hopper.

20. In a handling and dispensing system for filling containers and the like with expanded, low-density, loose-fill packaging material which is comprised of and wherein there are included:

(a) a main supply storage hopper for said loose-fill material; which is integrally in the circuit of
(b) a circulating system having at least a main header run for air-entrained conveyance of said loose-fill material out of and back into said main hopper (a); and
(c) air blowing means for entraining and carrying said loose-fill material through said circulating system (b); with
(d) a main header run in said circulating system (b) from which said loose-fill material is supplied and diverted; to
(e) at least a single packaging station in said system whereat said loose-fill material is dispensed for package filling and/or cushioning purposes; with
(f) each packaging station (e) having a separate holding and dispersing hopper for individual station supply of said loose-fill material; and
(g) each packaging station (e) having a distributing tube from its said holding hopper (f) to let out and dispense said loose-fill material for said packaging and cushioning purposes from each of said station holding hoppers (f); and also
(h) control valve means in each of said distributing tubes (g) for regulating the package filling flow of said loose-fill material from out of said distributing tube; with
(i) at least one diversion fitting (s) in said main header run (d) with (j) outlet(s) therein for feeding said loose-fill material to each separate holding hopper (f) at each single packaging station (e);

the improvement comprising:

(k) baffle means in each diversion fitting (i) which are within the confines of the said main header run (d) and situate over and above the entry of each outlet (j) into said main header run (d) within each of said fittings (i)

said baffle means (k) extends beyond the respective lateral edges of the discharge outlet (j) in said fitting (i) so as to have:

a downward or downstream extension overlap length that is between about 35% and about 50% of the general diameter of said main header run (d) and said fitting (i); and an inlet or upstream extension overlap length that is between about 15% and about 30% of the general diameter of said main header run (d) and said fitting (i).

* * * * *